United States Patent [19]

Matsumoto et al.

[11] 4,111,084
[45] Sep. 5, 1978

[54] LUG END CUTTING APPARATUS FOR ROLL-LIKE PRODUCTS

[75] Inventors: Yukimichi Matsumoto; Minoru Ueyama, both of Hirakata, Japan

[73] Assignee: Kabushiki Kaisha Fuji Tekkosho, Japan

[21] Appl. No.: 776,900

[22] Filed: Mar. 11, 1977

Related U.S. Application Data

[63] Continuation-in-part of Ser. No. 643,142, Dec. 22, 1975.

[30] Foreign Application Priority Data

Dec. 29, 1974 [JP] Japan ..................... 50-921

[51] Int. Cl.² .................. B23B 7/14; B23B 15/00
[52] U.S. Cl. ........................... 82/48; 82/90; 82/98; 82/100; 82/101; 82/102
[58] Field of Search ................. 82/46–48, 82/50–54, 90, 94–96, 101, 102, 98, 100

[56] References Cited

U.S. PATENT DOCUMENTS

| | | | |
|---|---|---|---|
| 3,055,245 | 9/1962 | McKay | 82/48 |
| 3,513,736 | 5/1970 | Thorman | 82/48 |
| 3,748,934 | 7/1973 | Lezberg | 82/48 |
| 3,851,991 | 12/1974 | Walker | 82/102 X |
| 3,861,254 | 1/1975 | Stoffels et al. | 82/90 |
| 3,933,090 | 1/1976 | Reynolds | 82/48 |

Primary Examiner—Leonidas Vlachos
Attorney, Agent, or Firm—Robert E. Burns; Emmanuel J. Lobato; Bruce L. Adams

[57] ABSTRACT

An end-trimming apparatus for roll-like products. The apparatus trims both ends of a roll comprising a sheet-like material wound up on a core, particularly, stretchable one such as plastics film, by cutting off the irregularity of both the ends, finishing them into flat faces. It comprises a conveying means for carrying rolls horizontally to a given location, a supporting means of a pair of chucks for supporting the roll at both the ends, while providing it with a rotation in the winding direction of the roll, and a cutting means provided close to the pair of chucks, including a pair of disk cutters arranged co-axially and having respectively separate shafts parallel with the shafts of the chucks, the disk cutters being capable of moving toward and away from each other and of reciprocating in the direction at right angle to said toward-and-away motion. The pneumatic and electric control means control the co-operation of the above means to effect an automatic or semi-automatic trimming of the roll ends in an orderly sequence, providing a great improvement in labor saving and cost reduction.

12 Claims, 12 Drawing Figures

LUG END CUTTING APPARATUS FOR ROLL-LIKE PRODUCTS

REFERENCE TO PRIOR APPLICATIONS

This application is a continuation-in-part of application Ser. No. 643,142 filed Dec. 22, 1975.

BACKGROUND OF THE INVENTION

This invention relates to an end-trimming apparatus for finishing into flat faces both ends of a roll products comprising a sheet material wound up on a core, particularly, stretchable one such as plastics film, by cutting off the irregularity of both the roll ends.

It is very difficult to wind up sheet materials such as plastics film, paper, and metal foil, which are continuously delivered, on hollow cores into rolls with flat ends, and even the use of a device for preventing the meandering running of the sheet cannot attain perfection. This trend will be more apparent as the running speed of the sheet increases and, particularly when the sheet is a stretchable one such as plastics film, it is further enhanced by the additional effect of tension exerted on the film, thus resulting in the irregular ends of the roll, as shown in magnification in FIG. 1. This irregularity of the roll ends not only decreases the commercial value of the products, but also causes troubles such that the sheet is often teared during the operation by extreme partial tensions exerted on the folded portions S2 of the sheet, which are protrusions of the sheet sides folded underneath the adjacent portions S1 of the sheet. This will lead to an increase in rejected products in the packing process due to broken sheets.

SUMMARY OF THE INVENTION

It is a primary object of the invention to provide an end-trimming apparatus for roll products which is capable of eliminating irregularities at both ends of the roll caused during the winding of sheet material and of preventing breakage of the sheet during the unwinding process, thus enhancing the commercial value of the roll products.

Another object of the invention is to provide an end-trimming apparatus which is capable of providing a sheet material regulated in size in width direction as well as facilitated in separating without any entanglement during unwinding, by finishing both ends of the roll of the sheet into flat faces.

Still another object of the invention is to provide an end-trimming apparatus which is capable of facilitating winding operation of a sheet material without use of any expensive and complicated device such as that for preventing the meandering of sheet, or by use of simplified devices.

It is also an important object of the invention to provide an end-trimming apparatus which is adapted to enhancing the labor-saving and automation of winding operation of sheet and is capable of effecting a great production efficiency.

The essentials of the end-trimming apparatus according to the invention comprises a pair of co-axial disk cutters provided, respectively, adjacent to both ends of a roll of a sheet material held with its both ends rotatingly in the winding direction, so that the disk cutters are capable of synchronously coming in contact with the portions of the roll adjacent to the ends.

The apparatus comprises a conveying means for carrying rolls to a given position, a supporting means for holding the roll horizontally and rotatingly at the position by chucking both the ends of the roll core, and a cutting means provided at a position above said supporting means, including said pair of disk cutters provided co-axially in parallel with the axis of said supporting means and capable of moving toward and away from each other and of reciprocating vertically. The disk cutters constitute the cutting edges with their circumferences, and their flat sides face each other from both the ends of the roll, respectively. The three means of conveying, supporting, and cutting are co-operated under the control of control means in a reasonable sequence. It is so arranged that either of approaching motion toward each other or lowering motion of the disk cutters may be effected prior to the other motion. Each of the pair of disk cutters is provided integrally with a detecting means such as a pneumatic-electric converter for detecting the ends of the roll.

The above and further objects and novel features of the invention will be more apparent from the following description of a preferred embodiment taken in reference to the accompanying drawings. It is to be expressly understood, however, that the drawings are for purpose of illustration only and that various changes within the scope of the claims may be resorted to without departing from the spirit of the invention.

DESCRIPTION OF THE PREFERRED EMBODIMENT

Figure 4:
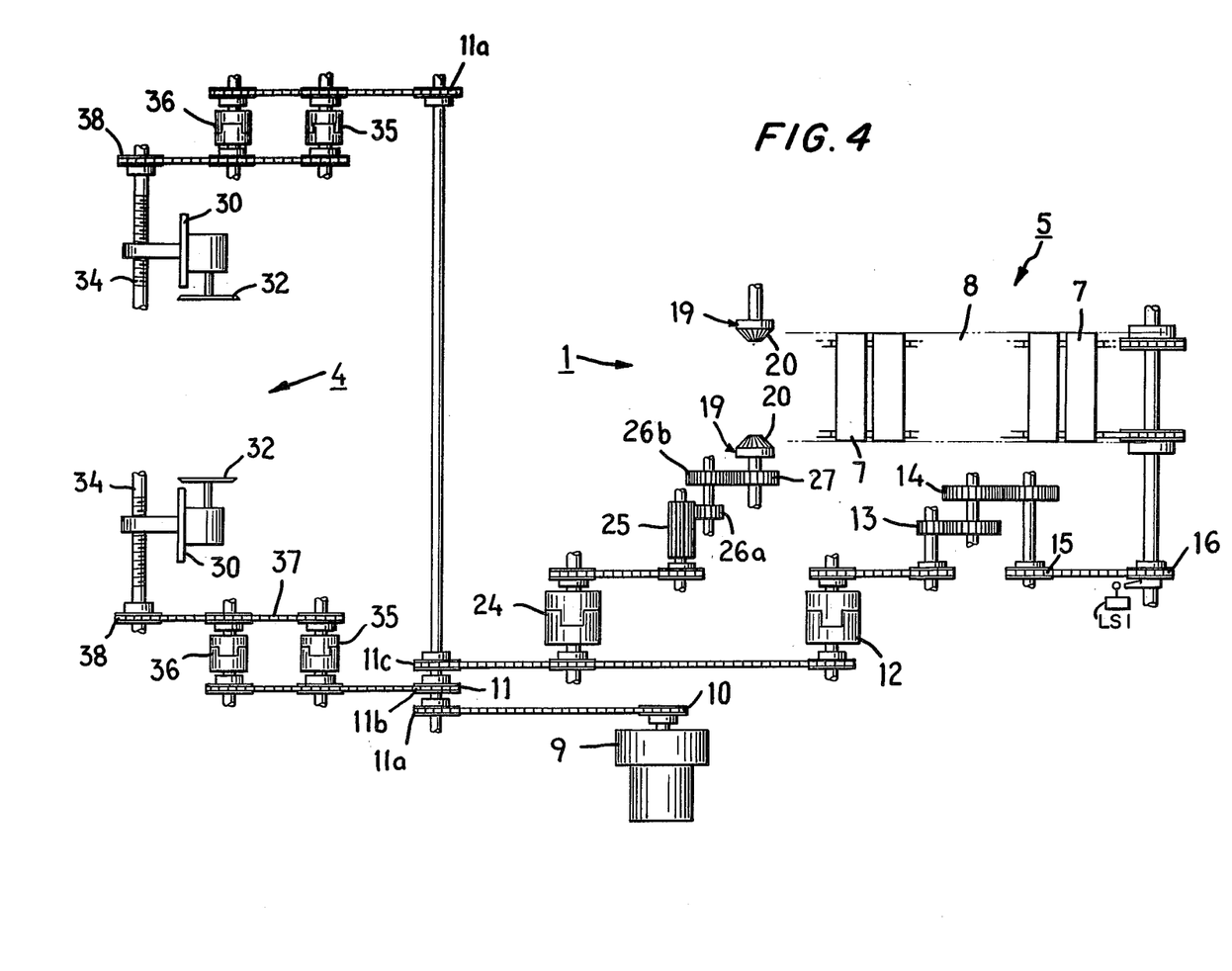
FIG. 4 is an exploded view showing the power transmission system driving the apparatus shown in FIG. 2.

An end-trimming apparatus according to the invention comprises a conveying means 5, a supporting means 1, and a cutting means 4. The conveying means 5 comprises an endless conveyer 8 mounted on a machine bed 6, which conveyer 8 having a plurality of cradles 7 attached thereon at given intervals and arranged at right angles with the length of the machine bed 6. The endless conveyer 8 is driven, as shown in FIG. 4, by a motor 9 through a sprocket 10, a multi-sprocket 11 comprising a plurality of sprockets 11a, 11b, 11c, and 11d fixed coaxially to a shaft, a clutch sprocket 12, gears 13 and 14, and sprockets 15 and 16, and on-off operation of the sprocket 12 transfers rolls R wound on hollow cores and placed on cradles 7 to a given cutting position P and stops there. The operation of the wheel 18 of a lift-regulating device 17 adjusts the level of the conveyer 8, so that the center of the hollow core of a roll R on the cradle 7 can be retained at a certain level at the cutting position.

The rolls R, which are of hollow cylindrical shape wound with a sheet material such as plastics film 2 on paper tubes or other hollow cores 3, are delivered from the preceeding process intermittently to the cutting position P, being placed orderly on each cradle 7 arranged on the endless conveyer 8 at right angles to the running thereof.

Figures 1, 2:
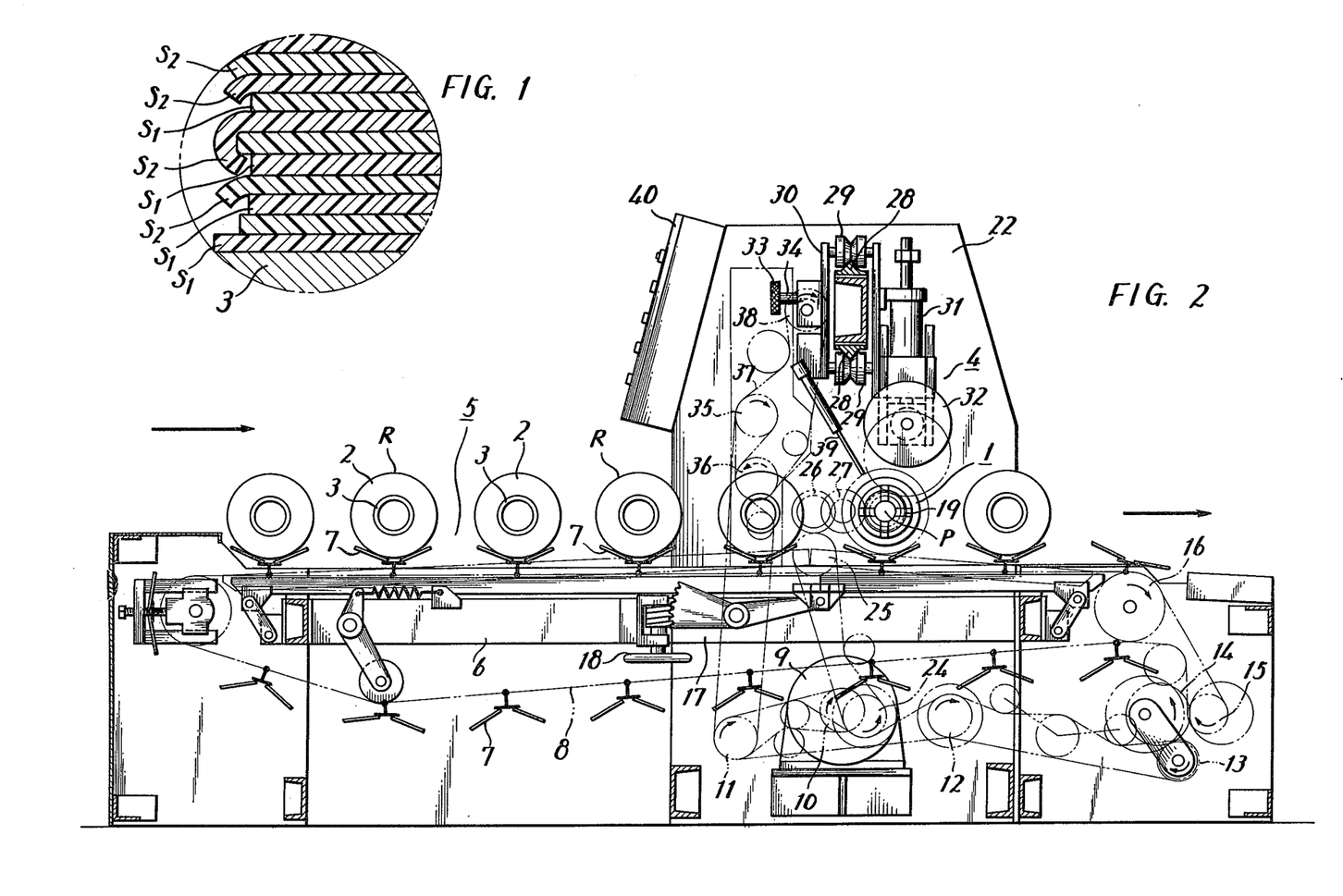
FIG. 1 is a partial sectional view showing a microscopically enlarged end portion of a roll product produced by use of a conventional winder.
FIG. 2 is a schematic side view of one embodiment of the end-trimming apparatus according to the invention.
Figure 3:
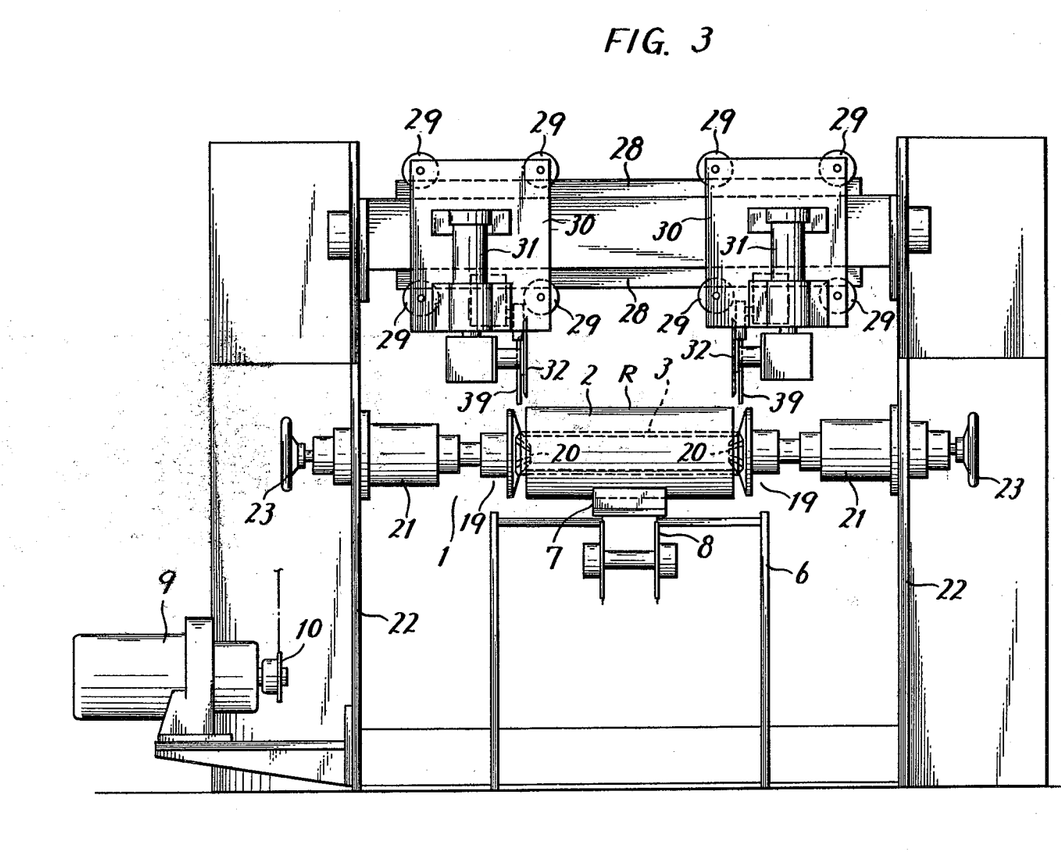
FIG. 3 is a front view showing schematically the cutting mechanism in the central portion of the apparatus in FIG. 2.
Figure 5:
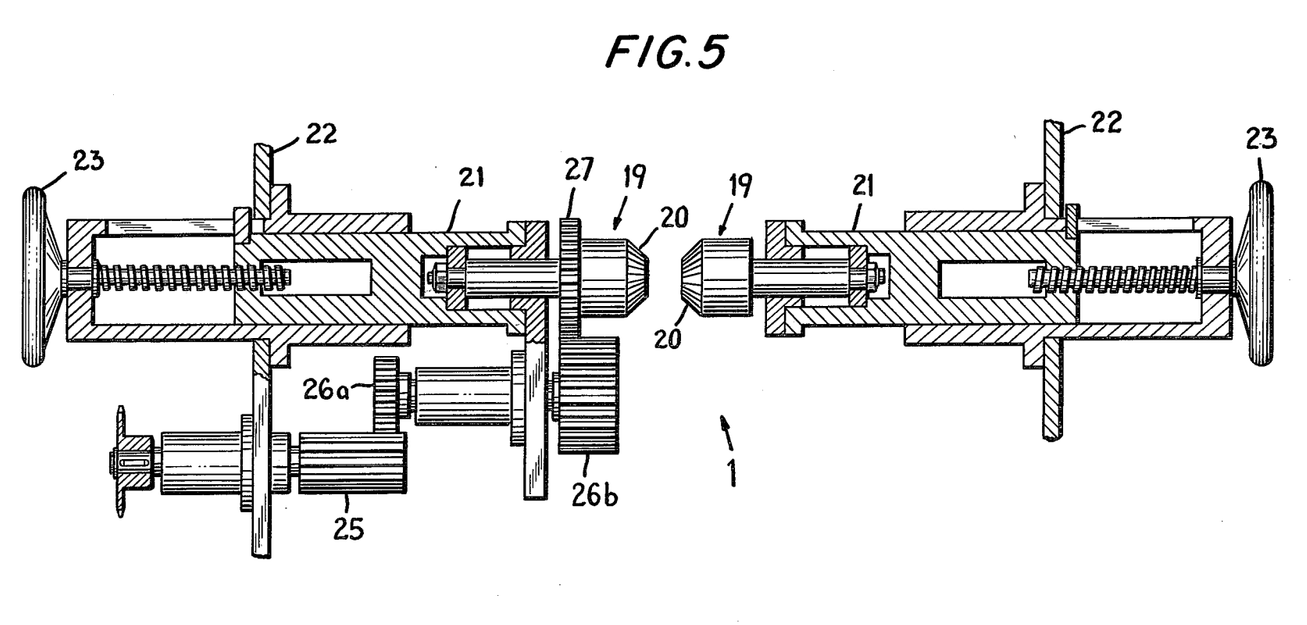
FIG. 5 is a side sectional view showing the substantial portion of the supporting means in FIG. 3.

The supporting means 1 comprises, as shown in FIG. 5, a pair of supporting members, each including a pneumatic cylinder 21, a chuck 19 engaged at its rear end with the rod of the pneumatic cylinder 21 and having in its front a projecting insertion end of conical shape. It is mounted, as shown in FIGS. 2 and 3, across the endless conveyer 8 on the machine frames 22, at both sides of the apparatus, with the supporting members being arranged horizontally and coaxially face to face with each other and the chucks being capable of moving toward and away from each other, so that the axial operating line of the supporting members is positioned horizontally above the cutting position P and slightly higher than the axis of the roll R placed on a cradle 7. Both the supporting members are provided respectively with a regulating wheel 23 which can turn a screw bar engaged with the body of the pneumatic cylinder 21, a clockwise turn of the wheel 23 moving the cylinder towards the center line of the apparatus and an anticlockwise turn away therefrom, thus effecting the adjustment of the operational reference points of the supporting members in compliance with the length of the roll R.

One of the supporting members has its cylinder rod provided with rotating power through a clutch sprocket 24 and gears 25, 26a and 26b, and 27, by the motor 9, the on-off operation of the clutch sprocket 24 letting the chuck 19, which is engaged with the front end of the cylinder rod, rotate or stop, as shown in FIG. 4.

Upon receiving an instruction signal, the pneumatic cylinders 21 advance their respective chucks 19 toward the respective ends of the roll R at the cutting position P and engage the insertion ends 20 of the chucks 19 into the ends of the hollow core 3 to fixedly grasp the roll at both the ends and to effect the correct positioning of the roll R.

The cutting means 4 comprises a guiding device mounted horizontally above the supporting means 1 and composed of a pair of convex rails 28 fixed back to back with each other, vertically and in parallel with the supporting means 1, a pair of sliding frames 30 engaged slidably with the pair of rails 28 of the guiding device with their pulleys 29 having hyperboloidal peripheral surfaces, pneumatic cylinders 31 fixed downwardly to each of the sliding frames 30, disk cutters 32 fixed to each end of the rods of said pneumatic cylinders 31, with their center shafts in line with each other and in parallel with the axis of said supporting means 1, and roll-end detecting devices 39.

Each sliding frame 30 has a bracket 41 projecting on the side and slidably engaged with a guide bar 42 fixed in parallel with the convex rails 28, so that the sliding frame 30 can be fastened to the guide bar 42 at an opitional position by means of a locking wheel 33 provided on the bracket 41. The guide bar 42 is held by one of its ends rotatably engaged with a screw bar 34 supported by a machine frame 22, and can be moved toward and away from the center line of the machine frames 22 by rotating a sprocket 38 fitted to the screw bar 34.

In the cutting means 4 thus composed, both the disk cutters 32 can be adjusted to the positions spaced respectively sidewards from both the ends of a roll R on the cradle by fastening the sliding frames 30 at suitable positions on the respective guide bars 42 by means of the locking wheels 33 on the brackets 41, and can be moved from the positions toward and away from the center line of the machine frames 22 by rotating the sprockets 38.

The rotation of the sprockets 38, accordingly, of the screw bars 34 is effected, as shown in FIG. 4, by the motor 9 through the multi-sprocket 11 and then, for each sprocket 38, through two clutch sprockets 35 and 36, rotating oppositely to each other and operating alternatively, with a chain 37 engaged with the sprocket 38 and these clutch sprockets together. When the sprocket clutches 25 are on, the screw bars 34 are rotated clockwise to shift the sliding frames 30 away from each other, and when the sprocket clutches 36 are on, anticlockwise to drive the sliding frames 30 toward each other.

The disk cutters 32, as shown, are attached to the shafts such that their flat faces face each other and circumferentially acute-angled edge surfaces opposite outwardly. Upon receiving an instruction signal to advance, the pneumatic cylinders 31 push the disk cutters down to the lower limit, adjusted in advance, in the direction at right angle to the cutter shafts, and upon receiving a return instruction, they elevate the disk cutters to return to the positions spaced from the roll R at the cutting position P.

Figure 6:
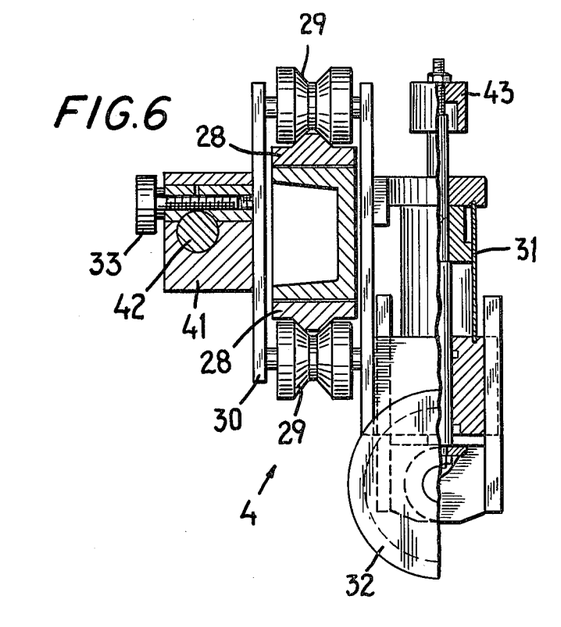
FIG. 6 is an enlarged partial section of the cutting means in FIG. 2.
Figure 7:
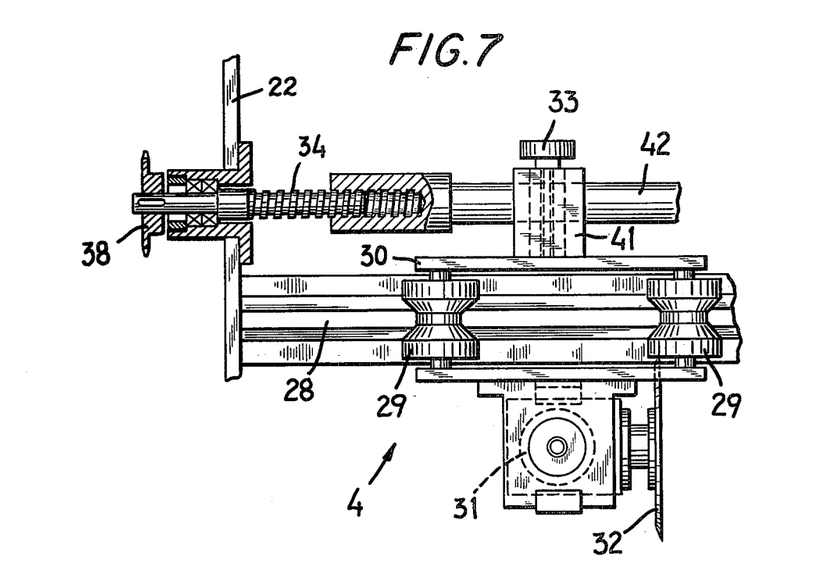
FIG. 7 is a partially sectional plan view of the cutting means shown in FIG. 3.

Said lower limit of the disk cutters is determined in accordance with the diameter of the core 3 of the roll R supported by the supporting means 1 such that the bottom edges of the disk cutters 32 will slightly touch the surface of the core 3. This is effected, as shown in FIG. 6, by adjusting the advancing length of the rods of the pneumatic cylinders 31 by means of regulating knobs 43 screwed to the rods projecting upward from the cylinder 31.

The roll-end detecting means 39 are fixed respectively to the ends of the rods of pneumatic cylinders 44 attached vertically to the sliding frames 30, in the positions several millimeters inward or outward the acting planes of the disk cutters 32, according to the mode of operation as later described. As the roll-end detecting means 39, available are switches with contact of photoelectric type, or other suitable ones; the present embodiment employs the pneumatic-electric converter such as a nozzle flapper which catches the variation of back pressure as electric signals when the compressed air blown from the nozzle hits the surface of the roll ends R at a nearest distance, and thereby gives on-or-off instructions to the clutch sprockets 35, 36.

Figure 8:
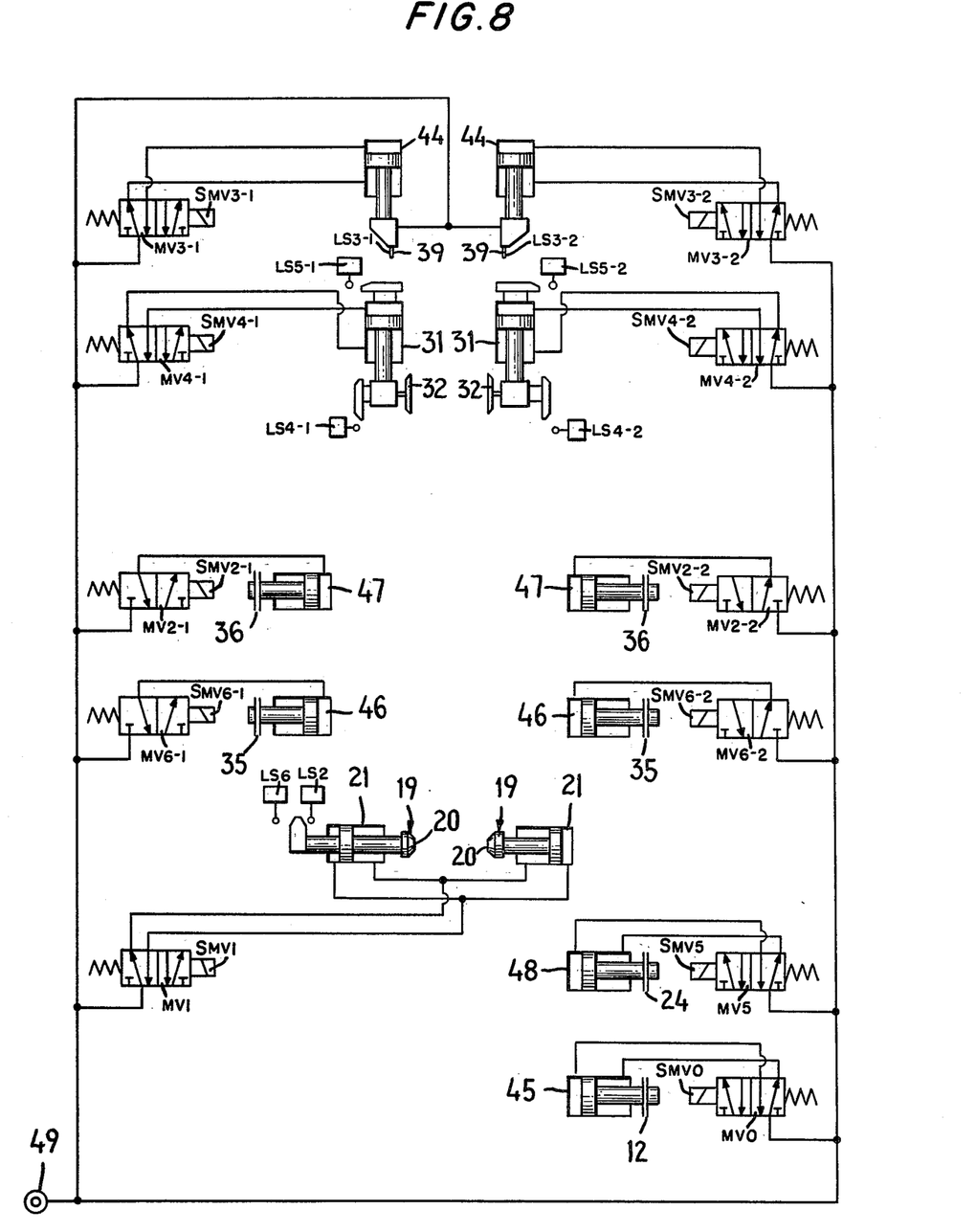
FIG. 8 is a piping diagram of the pneumatic system for controlling the pneumatic cylinders for operating the apparatus shown in FIG. 2.

The end-trimming apparatus, as hereinbefore described, is provided with a pneumatic control system and an electric control system. The pneumatic control system, as shown in FIG. 8, comprises a pneumatic cylinder 45 linked to the sprocket clutch 12 for starting and stopping the endless conveyer 8 and an electromagnetic valve MV0 for controlling the pneumatic cylinder 45, the pneumatic cylinders 21 of the chucks 19 and an electormagnetic valve MV1 for simultaneously controlling both the pneumatic cylinders 21, pneumatic cylinders 46 linked to the sprocket clutches 35 and electromagnetic valves MV6-1, MV6-2 for controlling each of the pneumatic cylinders 46, pneumatic cylinders 47 linked to the sprocket clutches 36 and electromagnetic valves MV2-1, MV2-2 for controlling each of the pneumatic cylinders 47, a pneumatic cylinder 48 linked to the sprocket clutch 24 and an electromagnetic valve MV5 for controlling the pneumatic cylinder 48, the pneumatic cylinders 31 and electromagnetic valves MV4-1, MV4-2 for controlling each of the pneumatic cylinders 31, and pneumatic cylinders 44 and electromagnetic valves MV3-1, MV3-2 for controlling each of the pneumatic cylinders 44. Each of these electromagnetic valves MV0 to MV6-2, which is of a spring-offset two-portion type, is operated by the pneumatic line from a pneumatic source 49 to forward or retreat the rod of the corresponding pneumatic cylinder.

Figure 9:
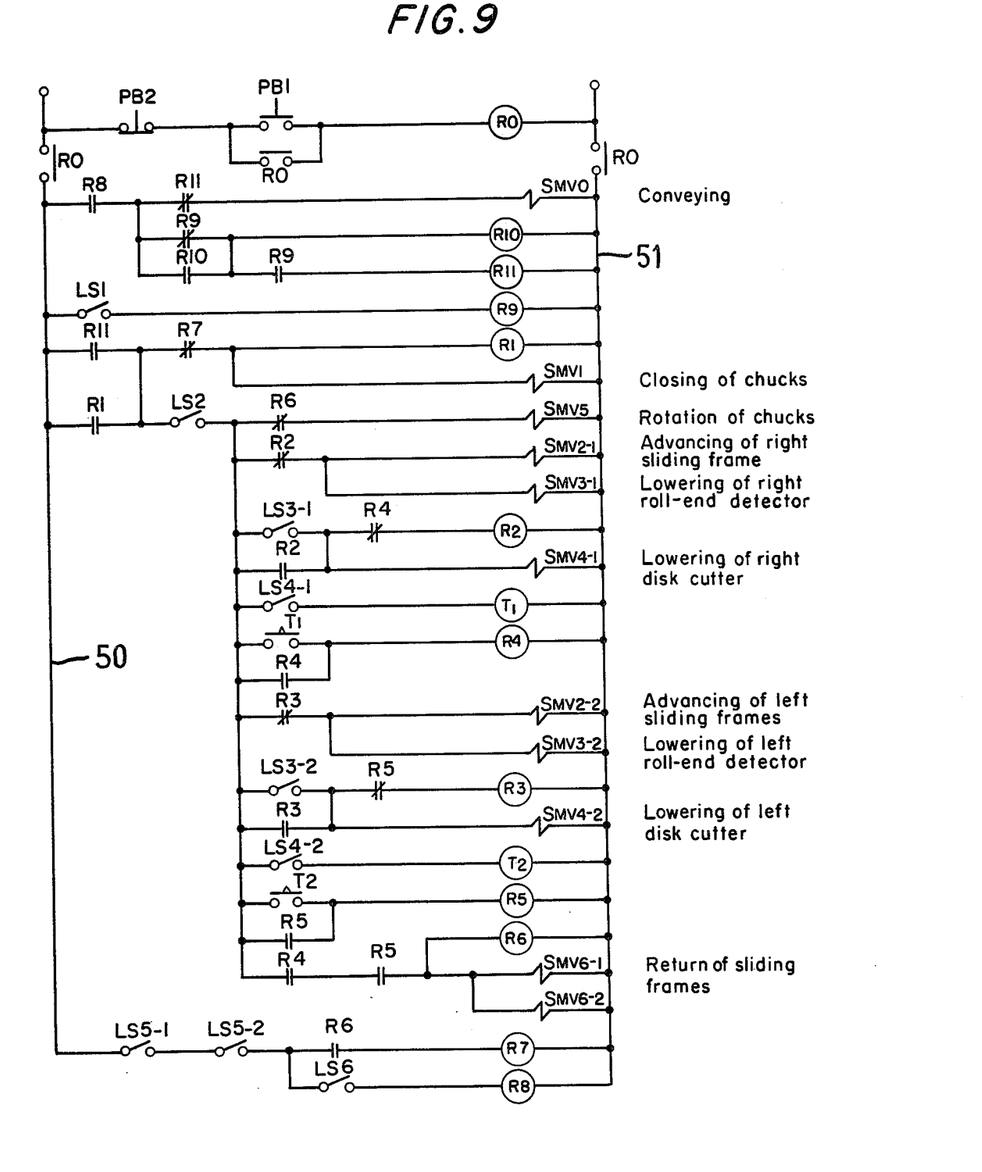
FIG. 9 is a circuit diagram showing the essential system for effecting automatic operation of the apparatus shown in FIG. 2.

The electric control system is shown in FIG. 9, in which PB1 represents a push button switch for starting the operation and PB2 is a push button switch for stopping the operation of the apparatus. The operation of the push buttom PB1 excites the relay R0 to connect the source lines 50, 51 to the power source and thus to actuate the control circuits.

R1 to R11 are auxiliary relays and LS1 is a limit switch which closes on detecting that a cradle 7 on the conveyer 8 has reached to the given cutting position P; the location of the limit switch LS1 is shown in FIG. 4. LS2 is a limit switch which closes on detecting the chucks 19 have advanced to given positions, LS3-1 and LS3-2 are a pair of limit switches which are closed when the roll-end detecting means have approached close to the object, LS3-1 being for right one and LS3-2 for left one of the detecting means, LS4-1 and LS4-2 are limit switches which are closed when the right and left disk cutters 32 have lowered to given positions, respectively, and LS5-1 and LS5-2 are limit switches which are closed respectively when the right and left disk cutters 32 have returned to the elevated positions and the sliding frames 30 are at the original positions. LS6 is a limit switch which closes on detecting the right and left chucks 19 have synchronously returned to the original positions and T1 and T2 are timers to hold the right and left disk cutters 32 at the positions, respectively, during the roll rotates at least one revolution after the disk cutters 32 have lowered to the given lower limits.

OPERATION

Figure 10:
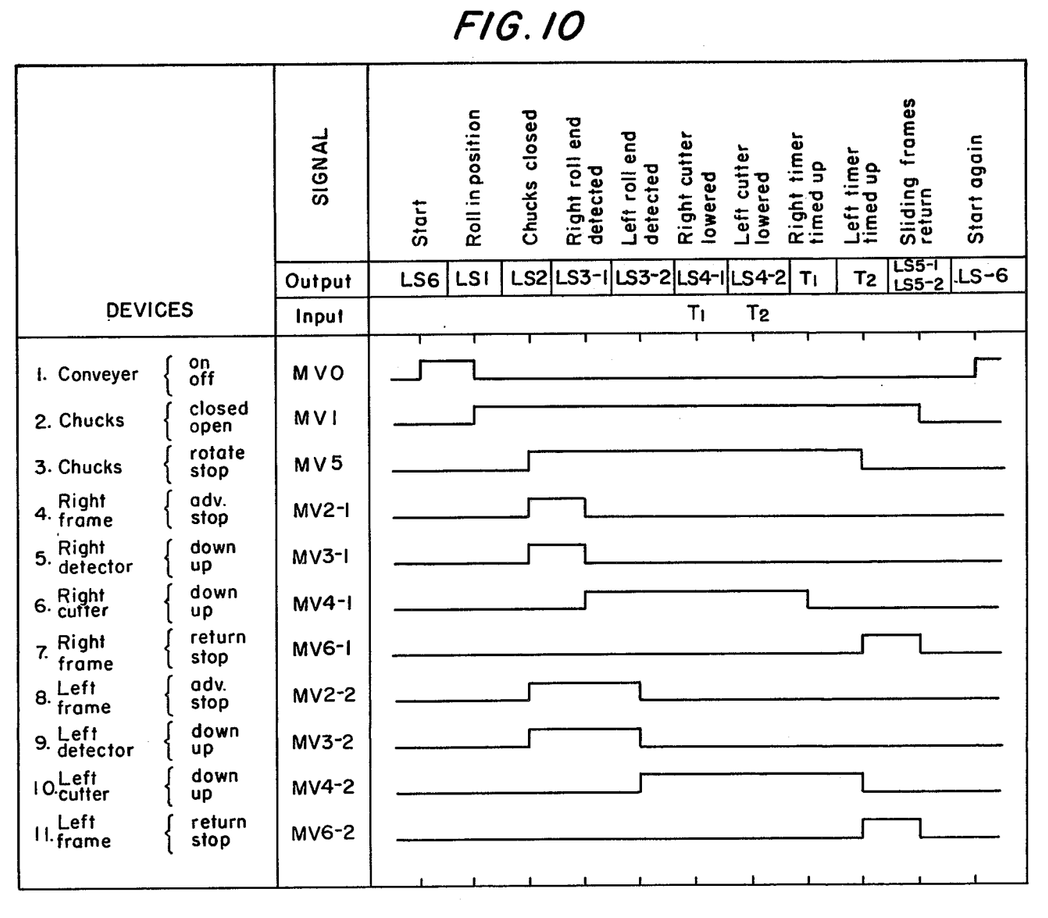
FIG. 10 is a time chart illustrating the operation of the apparatus shown in FIG. 2, and FIGS. 11 and 12 are illustrations each showing a preferred mode of the operation of the end-trimming apparatus according to the invention.

The operation of the end-trimming apparatus is hereinafter illustrated in reference to FIGS. 8 and 9 and FIG. 10 showing the time chart. If the push button switch PB1 on the control panel 40 (FIG. 2) is pushed on, the full automatic sequence of operations is carried out. When the motor 9 is instructed to start rotation, the limit switches LS5-1, LS5-2 and the limit switch LS-6 are closed since both the disk cutters 32 are at the elevated positions and the sliding frames 30 at the original positions and so are both the chucks 19, so that the relay R8 is excited. The excited relay 8 closes its contact R8 to excite the solenoid SMV0 of the electormagnetic valve MV0, which forwards the rod of the pneumatic cylinder 45 to engage the sprocket clutch 12, so that the conveyer 8 is revolved. Together with the solenoid SMV0, the relay R10 is excited, which is self-sustained.

The revolving conveyer 8 transfers the rolls R on the cradles 7 and, when one of the rolls R comes to the cutting position P, the limit switch LS1 is closed and excites the relay R9. The excited relay R9 excites the relay R11 which, in turn, opens the normally closed contact R11 and demagnetizes the electromagnetic valve MV0, thus stopping the conveyer 8 by idling the sprocket clutch 12.

The excited relay R11 also excites the relay R1 by closing the normally open contact R11. At the same time, the solenoid SMV1 of the electromagnetic valve MV1 is excited and forwards the the rods of both the pneumatic cylinders 21, accordingly, the chucks 19 toward the roll R at the cutting position P from both sides, and stops them when the conical insertion ends 20 are inserted to an extent into both the hollow ends of the paper tube core 3, during which time the chucks 19 are not yet rotated. Since the action line of the chucks 19 is shifted upward a little from the center line of the roll R on the cradle 7, the chucks 19 hold the roll up horizontally a little higher, thus securing the correct positioning of the roll R.

The completion of the holding of the roll R by the chucks 19 closes the limit switch LS2, which simultaneously excites the solenoid SMV5 of the electromagnetic valve MV5, the solenoids SMV2-1 and SMV2-2 of the electomagnetic valves MV2-1, MV2-2, a and the solenoids SMV3-1 and SMV3-2 of the electromagnetic valves MV3-1 and MV3-2, since the normally closed contacts R2 and R3 are held closed, for the relays R2 and R3 and inactive because of open limit switches LS3-1 and LS3-2. The excited electromagnetic valve MV5 forwards the rod of the pneumatic cylinder 48 to engage the clutch 24 and rotates the left chuck 19 in FIG. 5 and, accordingly, the roll R. The excited electromagnetic valves MV2-1 and MV2-2 forward the rods of the pneumatic cylinders 47, which engage the sprocket clutches 36, and the excited electromagnetic valves MV3-1 and MV3-2 forward the rods of the pneumatic cylinders 44 to lower the roll-end detecting means 39. Thus, the sliding frames 30 are moved toward each other with the detecting means 39 lowered nearly to the height of the roll ends.

On detecting the roll ends, the limit switches LS3-1 and LS3-2 are closed, so that the relays R2 and R3 are excited, which are self-sustained, and the solenoids SMV4-1 and SMV4-2 of the electromagnetic valves MV4-1 and MV4-2 are also excited. The excited relays R2 and R3 open their respective normally closed contacts R2 and R3, which demagnetize the electromagnetic valves MV2-1 and MV3-1, MV2-2 and MV3-2, respectively, so that the sliding frames 30 are stopped and the roll-end detecting means 39 are returned to the elevated positions. On the other hand, the excited electromagnetic valves MV4-1 and MV4-2 forward the rods of the electromagnetic cylinders 31, so that the disk cutters 32 are lowered to start the cutting operation. If the roll-end detecting means 39 are fixed, in advance, a few millimeters inwardly of the respective disk cutters 32, the disk cutters 32 will cut from the surface into the roll R so much inwardly from both the roll ends and, after cutting off the whole layers of the roll ends into round slices and cutting about 1 mm into the core 3, close the limit switches LS4-1 and LS4-2.

The closed limit switches LS4-1, LS4-2 actuate the timers T1 and T2, which close after the time sufficient to rotate the roll R about one revolution, to excite the electromagnetic relays R4 and R5. The excited relays R4, R5 demagnetize the relays R2 and R3 by opening the normally closed contacts R4 and R5, which, in turn, change over the electromagnetic valves MV4-1 and MV4-2 by opening the contacts R2 and R3, so that the disk cutters 32 are elevated to the original positions. At the same time, the electromagnetic relay R6 and the solenoids SMV6-1 and SMV6-2 of the electromagnetic valves MV6-1 and MV6-2 are also excited. The excited relay R6 demagnetizes the solenoid SMV5 of the electromagnetic valve MV5 by opening the normally closed contact R6, thus stopping the rotation of the chucks 19 and, accordingly, of the roll R. The operation of the electromagnetic valves MV6-1, MV6-2 forward the rods of the pneumatic cylinders 46 to engage the sprocket clutches 35, which drive the sliding frames 30 in away-from-each-other directions to return to their original positions.

When the sliding frames 30 have returned to the original positions, the limit switches LS5-1 and LS5-2 are closed and excite the relay R7, which demagnetizes the relay R1 and the solenoid SMV1 of the electromagnetic valve MV1. Thus, the chucks 19 retreat and release the roll R, which has been trimmed smoothly at both the ends, to drop on the cradle 7 staying right below.

The return of chucks 19 opens the limit switch LS2, and the whole circuits return to the original state as shown in FIG. 9.

Thus, the operations are repeated in the order of sequence described above, transferring and discharging the trimmed roll R from and feeding a new roll R to the cutting position P by revolving the conveyer 8 and effecting the end-trimming of the rolls successively.

Figure 12:
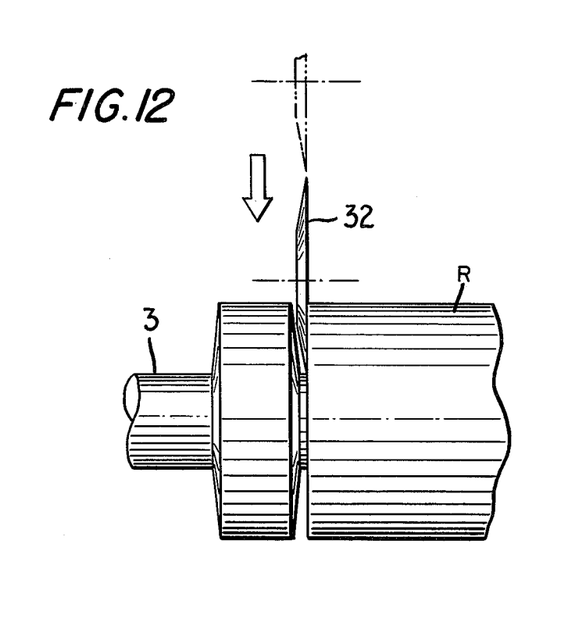

The mode of cutting the roll ends according to this embodiment is shown in FIG. 12.

Figure 11:
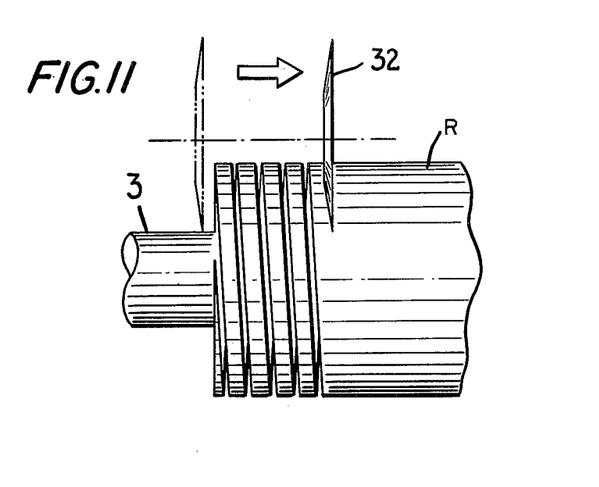

The order of the operational sequence is not limited to the above embodiment. It is possible to modify such that the disk cutters 32 are first lowered to the given height and then the sliding frames 30 are moved toward each other to cut off the sheet layers of the roll R and the surface layer of the core 3 from both the roll ends into spiral slices as shown in FIG. 11. The detecting means 39, in this case, are set required lengthes inwardly of the disk cutters 32. It is further possible to cut off the roll ends first in round slices, as shown above, and then into spiral slices. These modifications can be effected readily by modifying the control circuit and are also included in the scope of the present invention.

The present invention, as described, provides an end-trimming apparatus which enables the trimming into flat faces of the irregular end portions of roll products wound up with sheet materials depending upon no or little, if any, manual operation, by the co-operation of the conveying, supporting, and cutting means.

The roll products processed by means of the apparatus have beautiful appearance with the flat ends and high commercial values. The products, when used being developed into sheets, are free from difficulties such as tearing of the sheet caused by the irregularity of the ends, thus permitting easy handling and efficient use.

The apparatus has also an advantage that it obviates the necessity of strict regulation of roll ends in winding operation, thus effecting a simplification of the winding machine and a high efficiency of the operation.

What we claim is:

1. Apparatus for trimming both ends of a roll composed of sheet material wound on a hollow core, comprising conveying means for carrying a roll horizontally to a trimming position, supporting means for holding the roll horizontally and rotatably at said position including a pair of rotatable chucks disposed horizontally face-to-face and adapted to move toward and away from each other to engage or disengage with respective ends of the hollow core of the roll from both sides, means for moving said chucks toward one another to engage opposite ends of a roll and for moving said chucks away from one another to release a roll, and means for rotating at least one of said chucks to rotate said roll when the chucks are engaged with a roll, a pair of detecting means for detecting both ends of a roll held by said chucks, cutting means comprising a pair of disk cutters disposed coaxially with each other in parallel with the axis of said supporting means, each of said disk cutters having a flat face and a circumferentially acute-angled surface defining a cutting edge, said disk cutters being arranged with their flat faces facing each other and their circumferentially acute-angled edge surfaces facing outwardly, said disk cutters being capable of moving toward and away from each other and of lowering vertically so as to cut off from both ends of a roll held and rotated by said supporting means, means controlled by said detecting means for moving said disk cutters toward one another and means for lowering and raising said disk cutters, and control means including instruction circuits for controlling the sequence of operation of said apparatus to convey a roll to said trimming position by said conveying means, move said chucks toward one another to engage opposite ends of said roll, rotate at least one of said chucks while thus engaged to rotate said roll, operate said detecting means to detect both ends of said roll, move said disk cutters toward one another under control of said detecting means to position them with respect to the ends of said roll, lower said disk cutters to trim both ends of said roll as it is rotated by said chucks, raise said disk cutters, and move said chucks away from one another to release the trimmed roll for removal by said conveying means.

2. Roll-end trimming apparatus as claimed in claim 1, wherein said disk cutters are adjusted to lower to the height sufficient to cut the entire layers of sheet material wound on the core held by the supporting means.

3. Roll-end trimming apparatus as claimed in claim 1, wherein said supporting means is so arranged that the center line of said chucks is slightly above the horizontal center line of the roll carried on the coveying means.

4. Roll-end trimming apparatus as claimed in claim 1, wherein said roll end detecting means comprises a pair of detecting devices each of which is associated with one of said disk cutters respectively.

5. Roll-end trimming apparatus as claimed in claim 4, wherein said pair of detecting devices is a pair of pneumatic-electric converters.

6. Roll-end trimming apparatus as claimed in claim 4, wherein said pair of detecting devices is arranged a distance inwardly of the acting planes of the disk cutters and said control means include a circuit to effect the lowering of the disk cutters prior to the advance motion thereof toward the center, after the detecting devices have detected the roll ends.

7. Roll-end trimming apparatus as claimed in claim 4, wherein said pair of detecting devices is arranged a distance outwardly of the acting planes of the disk cutters and said control means include a circuit to effect the advance motion of the disk cutters toward the center prior to the lowering thereof.

8. Roll-end trimming apparatus as claimed in claim 4, wherein each of said disk cutters and the associated detecting device are mounted on a carriage running on a track parallel to the axis of said chucks.

9. Roll-end trimming apparatus as claimed in claim 8, wherein said means for moving said disk cutters toward and away from one another comprises pneumatic cylinders for moving said carriages along said track toward and away from one another.

10. Roll-end trimming apparatus as claimed in claim 1, wherein said means for moving said chucks toward and away from one another comprise a pair of pneumatic cylinders each having a piston rod on which the respective chuck is mounted.

11. Roll-end trimming apparatus as claimed in claim 10, further comprising manually operable means for moving said pneumatic cylinders toward and away from one another to selected positions.

12. Roll-end trimming apparatus as claimed in claim 10, wherein said means for rotating one of said chucks comprises a first gear on said chuck, a second gear meshing with said first gear and means for driving said second gear.

* * * * *